(12) United States Patent
Koskey

(10) Patent No.: US 10,470,436 B2
(45) Date of Patent: Nov. 12, 2019

(54) BOLSTER CRATE PAD

(71) Applicant: K&H MANUFACTURING, LLC, Colorado Springs, CO (US)

(72) Inventor: James Koskey, Colorado Springs, CO (US)

(73) Assignee: K & H Manufacturing, LLC, Colorado Springs, CO (US)

( * ) Notice: Subject to any disclaimer, the term of this patent is extended or adjusted under 35 U.S.C. 154(b) by 0 days.

(21) Appl. No.: 15/263,638

(22) Filed: Sep. 13, 2016

(65) Prior Publication Data

US 2019/0075754 A1    Mar. 14, 2019

(51) Int. Cl.
*A01K 1/03*    (2006.01)
*A01K 1/035*    (2006.01)
*A01K 1/02*    (2006.01)

(52) U.S. Cl.
CPC .......... *A01K 1/0353* (2013.01); *A01K 1/0245* (2013.01); *A01K 1/035* (2013.01)

(58) Field of Classification Search
CPC ..... A01K 1/035; A01K 1/0353; A01K 1/0245
USPC ........................................................ 119/28.5
See application file for complete search history.

(56) References Cited

U.S. PATENT DOCUMENTS

| | | | | |
|---|---|---|---|---|
| D366,368 S | * | 1/1996 | McCarthy | ........................ 5/655 |
| 5,960,739 A | * | 10/1999 | Storm | ................... A01K 1/0353 |
| | | | | 119/28.5 |
| 6,173,675 B1 | * | 1/2001 | Licciardo | ............. A01K 1/0353 |
| | | | | 119/28.5 |
| 7,231,888 B1 | * | 6/2007 | Kelly | .................... A01K 1/0353 |
| | | | | 119/161 |
| D612,547 S | * | 3/2010 | Zine | .............................. D30/118 |
| D614,362 S | * | 4/2010 | Zine | .............................. D30/118 |
| D626,701 S | * | 11/2010 | Kostial | ........................ D30/118 |
| D749,875 S | * | 2/2016 | Sullivan | ......................... D6/604 |
| D789,708 S | * | 6/2017 | Kraemer | ........................ D6/585 |
| 2002/0104166 A1 | * | 8/2002 | Mangiaracina | ........ A47D 13/08 |
| | | | | 5/655 |

(Continued)

FOREIGN PATENT DOCUMENTS

CA    2348039 A1 *  8/2002
DE    202012008129 U1 * 10/2012

OTHER PUBLICATIONS

K&H Pet Products. (Nov. 19, 2014). K&H Pet Products Self-Warming Crate Pad . Retrieved from Amazon: https://www.amazon.com/Pet-Products-Self-Warming-Crate-X-Small/product-reviews/B003ZYF1SE/ref=cm_cr_getr_d_paging_btm_next_2?ie=UTF8&reviewerType=all_reviews&mediaType=media_reviews_only&pageNumber=2.*

*Primary Examiner* — Monica L Williams
*Assistant Examiner* — Aaron M Rodziwicz
(74) *Attorney, Agent, or Firm* — Ice Miller LLP

(57) ABSTRACT

A bolster crate pad has a central pad that is rectangular with a pair of long ends and a pair of short ends. The central pad has a fabric cover and a filling. An inner bolster pad extends around a periphery of the central pad. An outer bolster pad is connected along a short end of the inner bolster pad. In one case, a second outer bolster pad is connected to a second short end of the inner bolster pad. In another case, the inner bolster pad has a number of trapezoidal subpads. The trapezoidal subpads can be isosceles trapezoids and they are connected together at their tops. The bolster crate pad may have two other outer bolster pads. This arrangement allows the bolster crate pad to fit a wide variety of crates without bunching in the corners.

6 Claims, 4 Drawing Sheets

(56) References Cited

U.S. PATENT DOCUMENTS

| | | | |
|---|---|---|---|
| 2002/0108578 A1* | 8/2002 | Kostial | A01K 1/0353 119/28.5 |
| 2003/0115670 A1* | 6/2003 | Antinoro | A01K 1/0353 5/420 |
| 2008/0127897 A1* | 6/2008 | Flannery | A01K 1/0353 119/28.5 |
| 2008/0216752 A1* | 9/2008 | Song | A01K 1/0353 119/28.5 |
| 2009/0031959 A1* | 2/2009 | Crowley | A01K 1/0353 119/28.5 |
| 2011/0290193 A1* | 12/2011 | Peregoy | A01K 1/033 119/480 |
| 2014/0190417 A1* | 7/2014 | Lipscomb | A01K 1/0353 119/28.5 |

* cited by examiner

BOLSTER CRATE PAD

RELATED APPLICATIONS

Not Applicable

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

Pets when they are sick, sleeping, or being transported are often placed in a crate. When a pet has to lie in a crate for an extended period of time they are uncomfortable since the floor is either rigid plastic or metal or a metal grid. As a result, owners often place pillows or pads in the crate to make their pets more comfortable. Unfortunately, pet crates come in many different styles and sizes. As a result, the pillow or pad either crowds the pet or slides around in the crate resulting in the pet lying partly of the pad and partly on the rigid floor. There have been some attempts to solve this problem by adding side pillows or bolsters that can folded up to fit a small number of different sized crates. One problem with this solution is that it really only fits crates with very small variations in size. This means that the manufacturer of the pad has to make a wide variety of different sized pads. It also means the retail store has to stock a large number of different sized pads, which is expensive and reduces floor space for other items.

Thus there exists a need for a bolster crate pad that can fit a wide variety of different sized crates.

BRIEF SUMMARY OF INVENTION

A bolster crate pad that overcomes these and other problems has a central pad that is rectangular with a pair of long ends and a pair of short ends. The central pad has a fabric cover and a filling. An inner bolster pad extends around a periphery of the central pad. An outer bolster pad is connected along a short end of the inner bolster pad. In one embodiment, a second outer bolster pad is connected to a second short end of the inner bolster pad. In another embodiment, the inner bolster pad has a number of trapezoidal subpads. In one embodiment, the trapezoidal subpads are isosceles trapezoids and they are connected together at their tops. The bolster crate pad in one embodiment has two other outer bolster pads. This arrangement allows the bolster crate pad to fit a wide variety of crates without bunching in the corners. As a result, it significantly reduces the number of different sizes of pads required to be made and stocked.

DETAILED DESCRIPTION OF THE INVENTION

The invention is directed to a bolster crate pad that has a central pad which is rectangular with a pair of long ends and a pair of short ends. The central pad has a fabric cover and a filling. An inner bolster pad extends around a periphery of the central pad. An outer bolster pad is connected along a short end of the inner bolster pad. In one embodiment, a second outer bolster pad is connected to a second short end of the inner bolster pad. In another embodiment, the inner bolster pad has a number of trapezoidal subpads. In one embodiment, the trapezoidal subpads are isosceles trapezoids and they are connected together at their tops. The bolster crate pad in one embodiment has two other outer bolster pads. This arrangement allows the bolster crate pad to fit a wide variety of crates without bunching in the corners. As a result, it significantly reduces the number of different sizes of pads required to be made and stocked.

Figure 1:
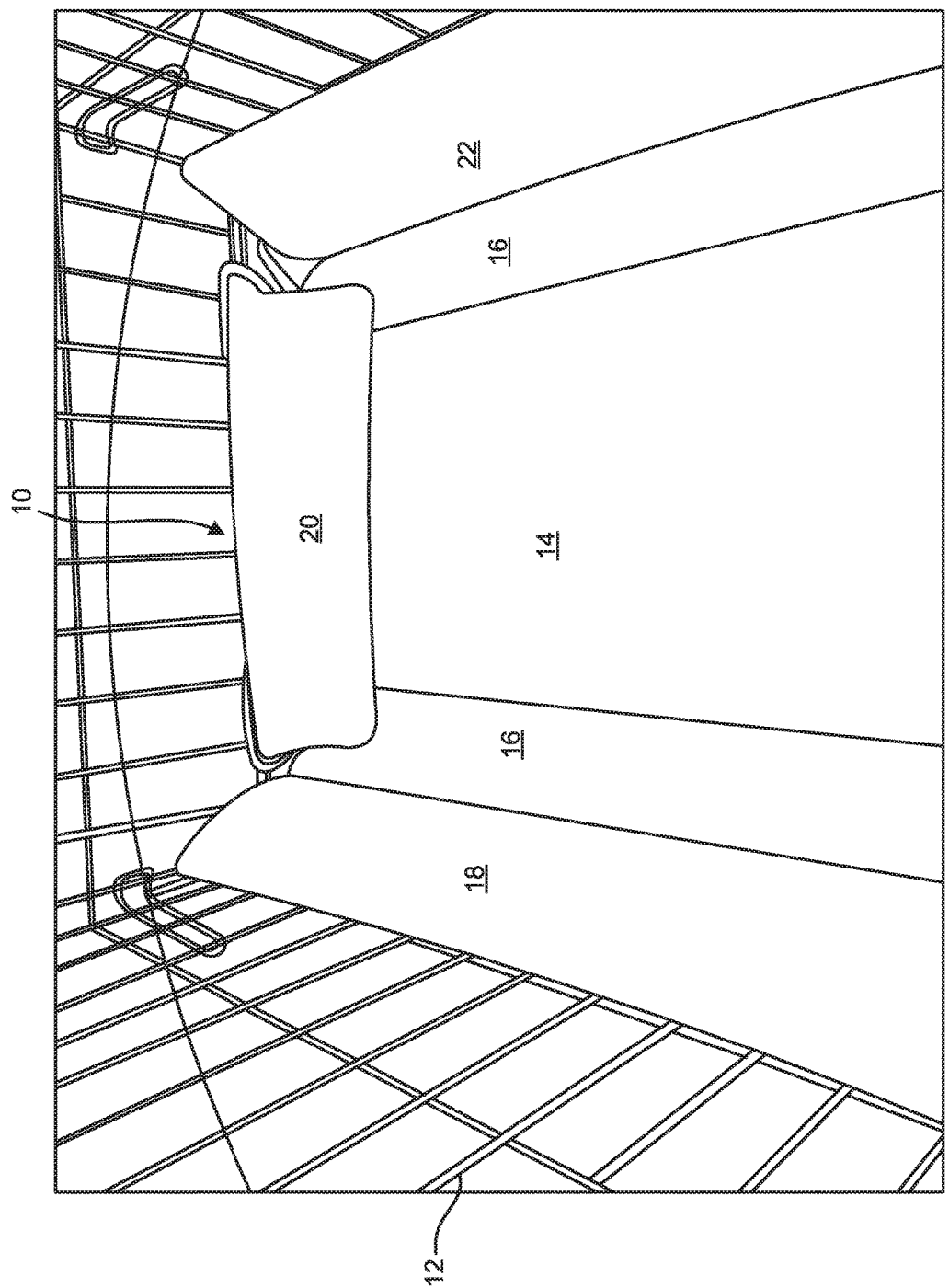
FIG. 1 is a partial perspective view of a bolster crate pad in a crate, in accordance with one embodiment of the invention.

FIG. 1 is a partial perspective view of a bolster crate pad 10 in a crate 12, in accordance with one embodiment of the invention. The bolster crate pad 10 consists of a central pad 14 surrounded by an inner bolster pad 16 and a number of outer bolster pads 18, 20, 22. One of the outer bolster pads 22 is folded over the inner bolster pad 16. Note that there is no bunching in the corners where outer the bolster pad 22 meets outer bolster pad 20 or where outer bolster pad 18 meets outer bolster pad 20. As can be seen this design allows the bolster crate pad 10 to fit a variety of different sizes and styles of crates.

Figure 2:
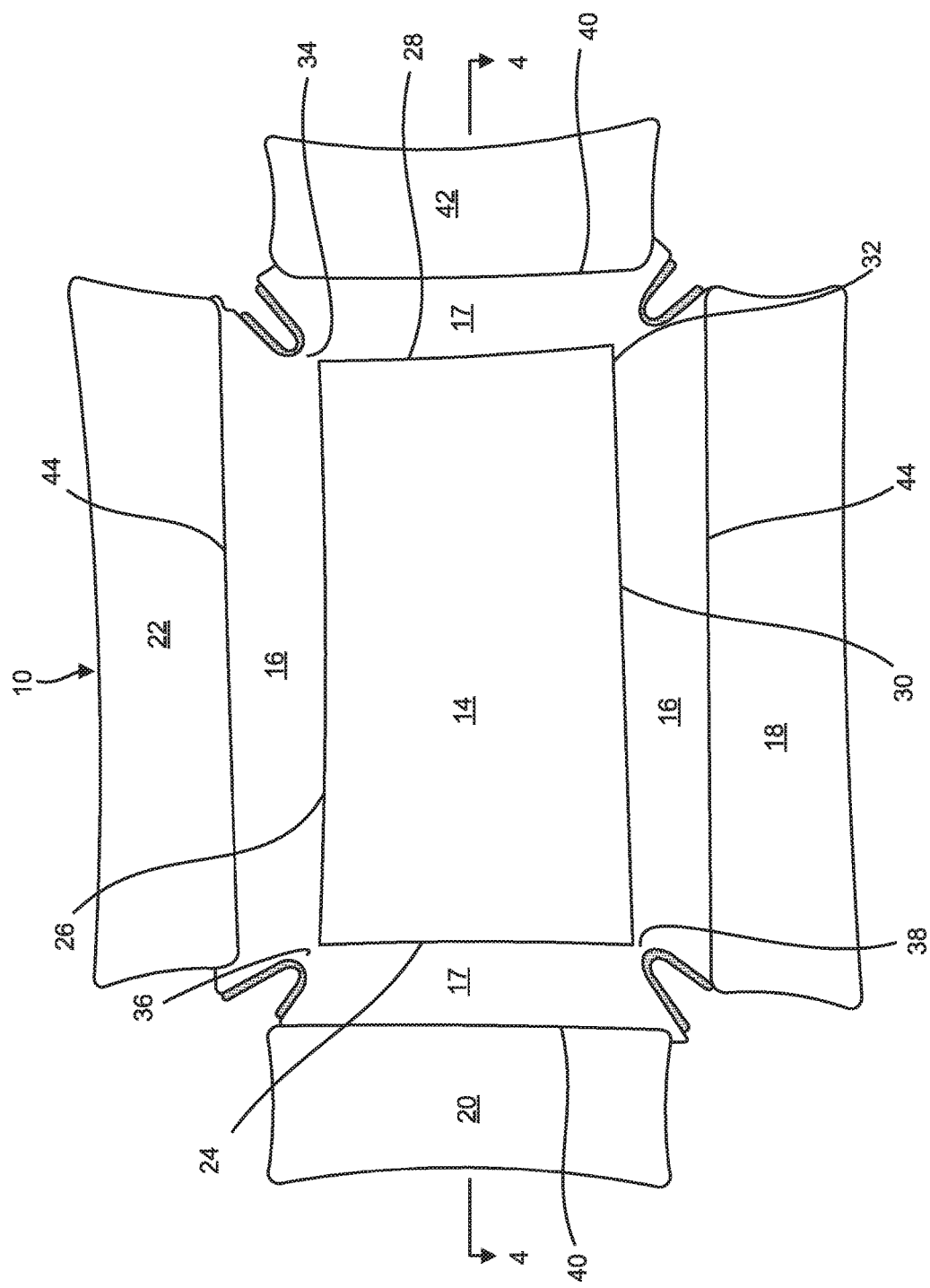
FIG. 2 is a top view of a bolster crate pad in accordance with one embodiment of the invention.

FIG. 2 is a top view of a bolster crate pad 10 in accordance with one embodiment of the invention. The bolster crate pad 10 has a central pad 14 that is rectangular. The central pad 14 has a periphery 24, 26, 28, 30 with two long ends 26, 30 and a pair of short ends 24, 28. An inner bolster pad 16, 17 extends around the periphery 24, 26, 28, 30 of the central pad 14. The inner bolster pad 16, 17 consists of four subpads 16, 17 that are isosceles trapezoids in one embodiment. The isosceles trapezoids are connected at the corners 32, 34, 36, 38 of their tops 24, 26, 28, 30. At the base 40 of each of the short trapezoids 17 is connected an outer bolster pad 20, 42. At the base 44 of each of the long trapezoids 16 is connected an outer bolster pad 18, 22. The outer bolster pads 18, 20, 22, 40 are rectangular shaped. Where the central pad 14 attaches 24, 26, 28, 30 to the inner bolster pad 16, 17 is a natural fold line of pivot. The same is true of where the inner bolster pad 16, 17 meets 40, 44 the outer bolster pads 18, 20, 22, 40. These fold lines allow the bolster pads to be adjusted to fit a wide variety of different sized crates. The trapezoidal subpads 16, 17 of the inner pad also allow for easy configuring of the crate pad 10 without bunching in the corners.

Figure 3:
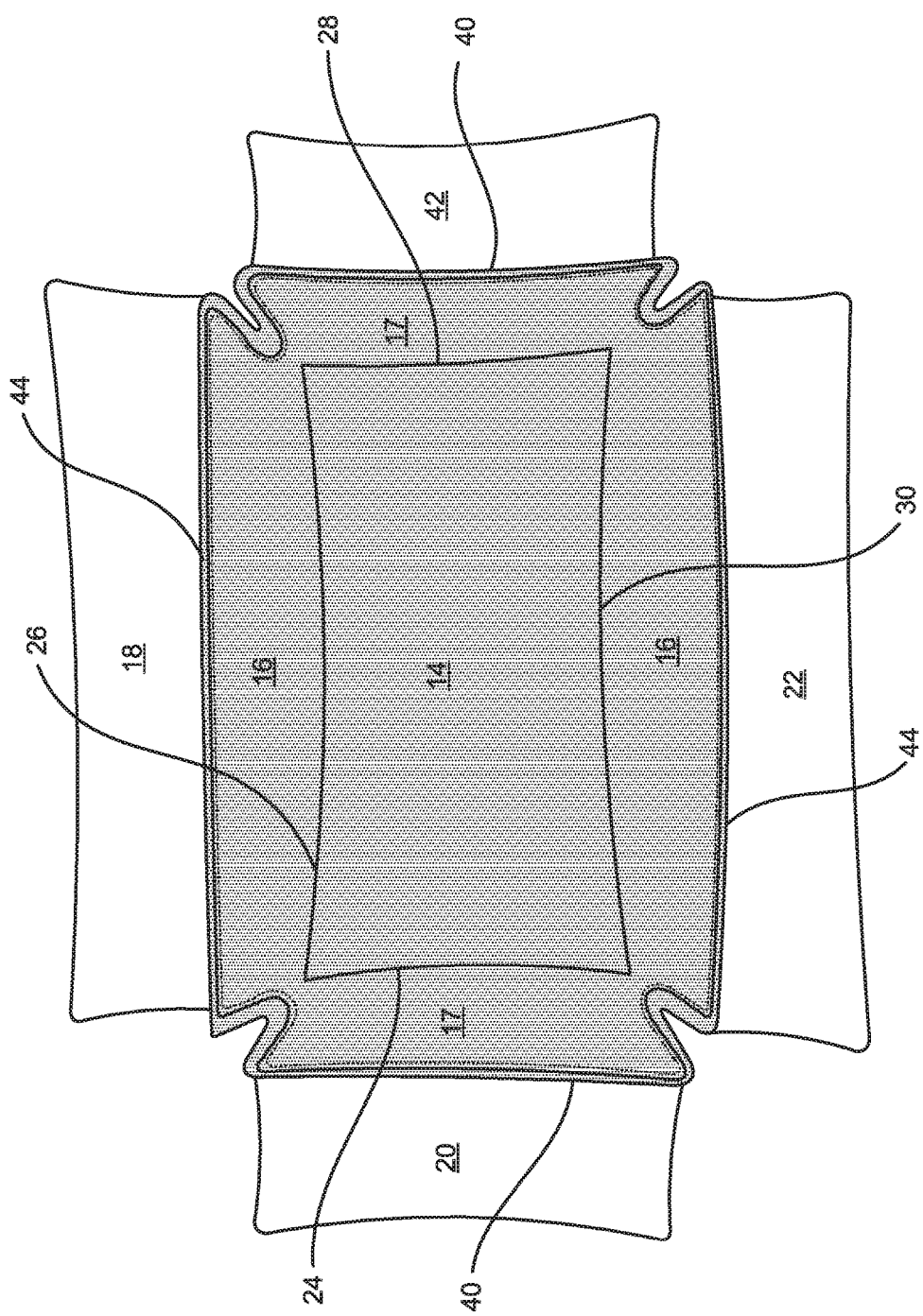
FIG. 3 is a bottom view of the bolster crate pad in accordance with one embodiment of the invention.

FIG. 3 is a bottom view of the bolster crate pad 10 in accordance with one embodiment of the invention. The main difference between the top side shown in FIG. 2 and this bottom side is that the top side is made of a fuzzy fabric and the bottom side is made of a smooth solid fabric.

Figure 4:
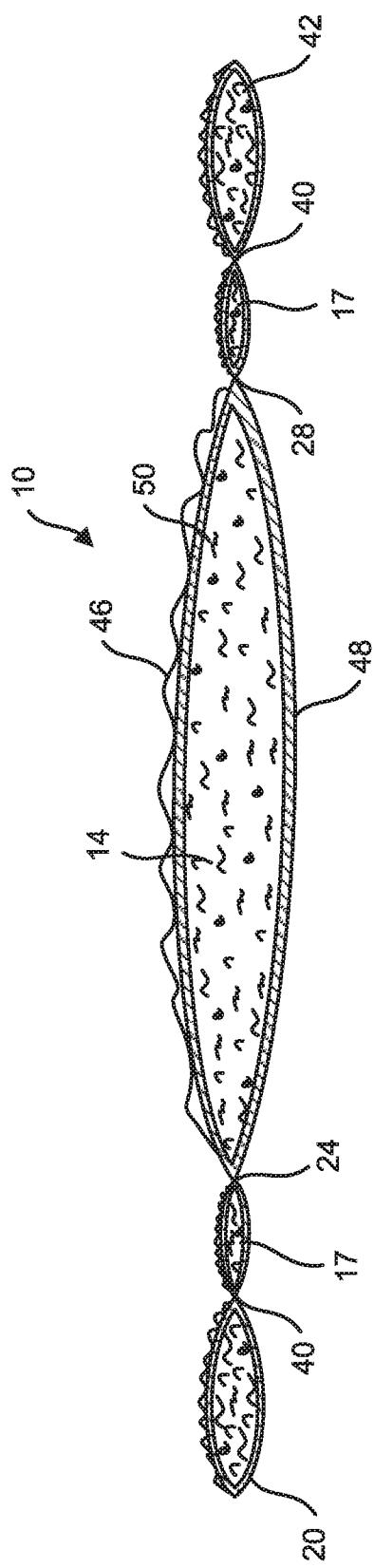
FIG. 4 is a cross sectional view of the bolster crate pad in accordance with one embodiment of the invention.

FIG. 4 is a cross sectional view of the bolster crate pad 10 in accordance with one embodiment of the invention. This view shows that the central pad 14 has a cover having a top fabric 46 and a lower fabric 48, which holds a filler material 50. The filler material 50 may be an open or closed cell foam pad or foam pieces or batting or any other suitable material. The top fabric 46 has a fuzzy or furry surface that faces the pet in one embodiment. The fuzzy surface is soft, comfortable, and warm. The inner pad 17 and outer pads 20, 42 have a similar construction with a cover 46, 48 encasing a filler material 50.

Thus there has been described a bolster crate pad that fits a wide variety of crates without bunching in the corners. As a result, it significantly reduces the number of different sizes of pads required to be made and stocked.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A bolster crate pad, comprising:
   a central pad that is rectangular having a pair of long ends and a pair of short ends;
   an inner bolster pad extending around a periphery of the central pad, the inner bolster pad comprising isosceles trapezoid corners at the corners of the inner bolster pad; and
   a plurality of independent outer bolster pads each of the plurality of independent outer bolster pads extending outwardly from an outer periphery of the inner bolster pad, and hingedly sewn to an outer periphery of the inner bolster at a fold line.

2. The bolster pad of claim 1, wherein the inner bolster pad is not rectangular.

3. The bolster pad of claim 2, wherein the inner bolster pad has a plurality of trapezoidal subpad.

4. The bolster pad of claim 3, wherein each of the plurality of trapezoidal subpads, have a top and the tops are connected together.

5. The bolster pad of claim 1, wherein the outer bolster pad is rectangular.

6. The bolster pad of claim 3, wherein the plurality of trapezoidal subpads are isosceles trapezoids.

* * * * *